Nov. 13, 1923.
C. B. LONG
1,473,995
DRILLING MACHINE
Filed June 15, 1921
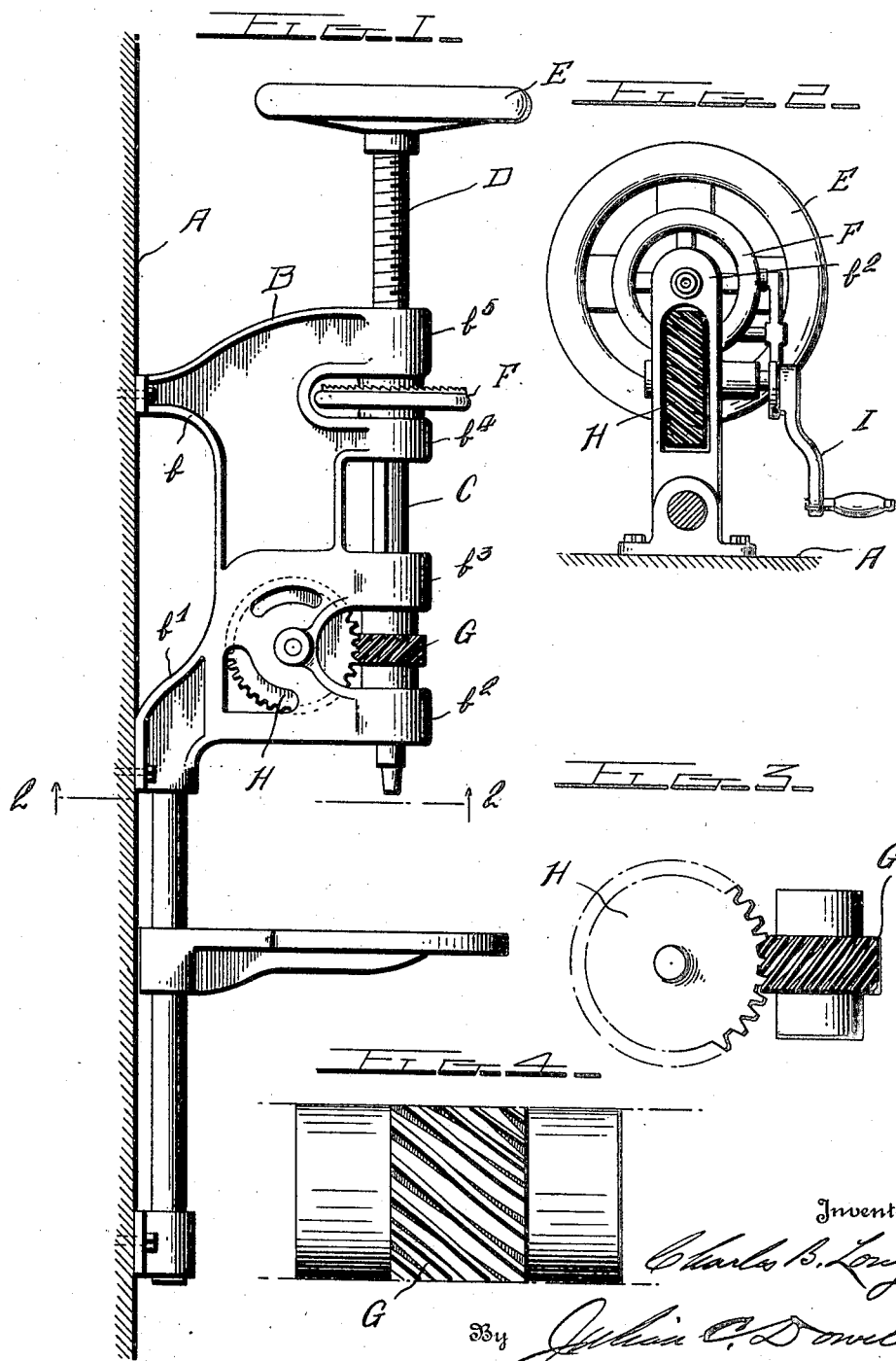

Patented Nov. 13, 1923.

1,473,995

UNITED STATES PATENT OFFICE.

CHARLES B. LONG, OF LANCASTER, PENNSYLVANIA, ASSIGNOR TO CHAMPION BLOWER & FORGE COMPANY, OF LANCASTER, PENNSYLVANIA, A CORPORATION OF PENNSYLVANIA.

DRILLING MACHINE.

Application filed June 15, 1921. Serial No. 477,650.

*To all whom it may concern:*

Be it known that I, CHARLES B. LONG, a citizen of the United States, residing at Lancaster, in the county of Lancaster and State of Pennsylvania, have invented certain new and useful Improvements in Drilling Machines; and I do hereby declare the following to be a full, clear, and exact description of the invention, such as will enable others skilled in the art to which it appertains to make and use the same.

This invention relates to drilling machines, and has for its object to provide a simple, efficient and inexpensive drilling machine having spiral gears for imparting a rapid and positive rotary movement to the drill with a noiseless and easy running movement, the spiral driving gears having their bearings in a frame structure designed and adapted to shield and protect them from dust, and the several parts being assembled in compact form so as to occupy little space.

The invention will first be hereinafter more particularly described, with reference to the accompanying drawings, which are to be taken as a part of this specification, and then pointed out in the claim at the end of the description.

In said drawings,

Fig. 1 represents a side elevation of a post drill embodying my invention; the operating handle and associated mechanism for actuating the feed screw being omitted;

Fig. 2 is an end view, partly in section taken on the line 2—2 of Fig. 1, looking in the direction of the arrow;

Fig. 3 is a detail view of the intermeshing spiral driving gears; and

Fig. 4 is a detail plan view on an enlarged scale of the smaller spiral gear detached, illustrating more clearly the construction of the raised spiral ribs or teeth.

Referring to said drawings, in which the same reference characters are used to denote corresponding parts in different views, the letter A denotes a vertical support or standard to which is bolted or otherwise secured a frame structure or bracket B, which is formed integrally with supporting legs $b$, and $b^1$, for attaching it to a post or other support, and with forwardly projecting arms $b^2$, $b^3$, $b^4$ and $b^5$, in which the drill spindle C and feed screw D are mounted; the drill spindle being revoluble and slidable longitudinally in the arms $b^2$, $b^3$ and $b^4$, while the feed screw is slidable longitudinally in the arms $b^4$ and $b^5$ but non-rotatable. The reduced upper end of the drill spindle C passes through said feed screw and has secured thereon, so as to bear upon the end of the feed screw, a balance wheel E, which rotates with the spindle and moves vertically therewith and with the feed screw. Between the arms or projections $b^4$ and $b^5$ is rotatably mounted on the feed screw a ratchet wheel F, the hub of which is interiorly screw-threaded to receive the correspondingly threaded feed screw, so that when the ratchet wheel is rotated it will move the feed screw longitudinally and cause the drill spindle to advance or recede, according to the direction in which it rotates. The ratchet wheel may be rotated by means of such devices as are ordinarily employed for effecting a step by step movement of the ratchet wheel, in a manner well known to users of this class of machines. A gear wheel G having spiral ribs or teeth, which extend at an angle of about 45 degrees to its axis, is mounted on the drill spindle C, between the arms or projections $b^2$ and $b^3$ of the frame B, by spline and groove connection, so as to cause the gear wheel and spindle to rotate together while permitting independent longitudinal movement of the spindle. The gear wheel G meshes with a main driving gear H, which is also formed or provided with spiral ribs or teeth similar to those of the gear wheel G, and has its bearings in opposite sides of a hollowed out portion of the frame structure wherein it is housed, rearwardly of the apertures or openings in the projections $b^2$ and $b^3$ through which the drill spindle passes, while the intermeshing gear wheel G is fitted closely between the overlying and underlying projections, thus forming a combined support and shield whereby said driving gears are protected from dust. As indicated in Fig. 4 of the drawings, the spiral ribs or teeth of the gears G and H present beveled or inclined surfaces on opposite sides thereof facing one way on one side and extending from a point about midway thereof to the end of the rib, and facing the other way on the other side and extending from said intermediate point to its other end, whereby an easy running, positively driven, noiseless, steady and rapid rotary movement may be imparted to the drill spindle by means of an operating crank handle I or other source of power applied to the driving shaft of the spirally toothed gear wheel H.

Having thus described my invention, what I claim as new and desire to secure by Letters Patent of the United States is:

A drilling machine comprising a supporting frame having a main body portion provided with means for attaching it to a vertical wall or other fixture; said body portion having upper and lower pairs of forwardly projecting arms, and a hollowed out portion rearwardly of the free ends of the lower pair of arms, said arms having alined apertures therein, a spiral driving gear housed in said hollowed out portion, a feed screw and connected drill spindle fitted in the apertures in said arms, and a spiral driven gear confined on said spindle between said lower pair of arms in mesh with said spiral driving gear.

In testimony whereof I affix my signature in the presence of two witnesses.

CHARLES B. LONG.

Witnesses:
GEORGE HAMMOND,
ARTHUR M. SMITH.